United States Patent [19]

Bauman

[11] 3,925,556
[45] Dec. 9, 1975

[54] ANTI MICROBIAL COMPOSITIONS CONTAINING UNSYMMETRICAL OLIGOQUATERNARY AMMONIUM COMPOUNDS

[75] Inventor: Robert Andrew Bauman, New Brunswick, N.J.

[73] Assignee: Colgate-Palmolive Company, New York, N.Y.

[22] Filed: Sept. 17, 1974

[21] Appl. No.: 506,807

Related U.S. Application Data

[60] Continuation of Ser. No. 185,388, Sept. 30, 1971, abandoned, which is a division of Ser. No. 82,594, Oct. 21, 1970, abandoned, which is a continuation-in-part of Ser. No. 716,412, March 27, 1968, abandoned.

[52] U.S. Cl. ............... 424/329; 260/567.6; 424/54
[51] Int. Cl.² .................... A61K 7/22; A61K 31/14
[58] Field of Search ............................ 424/54, 329

[56] References Cited
UNITED STATES PATENTS

2,113,606   4/1938   Taub et al. ..................... 260/567.6
3,489,663   1/1970   Bayer et al. ........................ 204/59

OTHER PUBLICATIONS

J. Von Braun et al., Ber. 49: 2610–2612 (1916); J. Chem. Soc. 112:175 (1917).
A. P. Gray et al., Nature 181: 634–635 (1958).
F. Vidal, J. Org. Chem. 24: 680–683 (1959).
J. L. Hartwell et al., J. Am. Chem. Soc. 72: 2040–2044 (1950).
T. P. Abbiss et al., J. Chem. Soc. 2248–2254 (1964).

*Primary Examiner*—Shep K. Rose
*Attorney, Agent, or Firm*—Robert L. Stone; Herbert S. Sylvester; Murray M. Grill

[57] ABSTRACT

Unsymmetrical oligoquaternary ammonium compounds containing at least two onium nitrogen atoms. Typical compounds are: $[C_{12}H_{25}N^+(Me)_2(CH_2)_4N^+(Me)_2CH_2C_6H_5]Br$; $[C_{14}H_{29}N^+(Me)_2(CH_2)_{10}N^+(Me)_2CH_2C_6H_4Cl]Br_2$
and $[C_{12}H_{25}N^+(Me)_2(CH_2)_4N^+(Me)_2(CH_2)_2N^+(Me)_2CH_2C_6H_5]Br_3$
These compounds are effective as antimicrobial agents and as anticaries agents.

14 Claims, No Drawings

ANTI MICROBIAL COMPOSITIONS CONTAINING UNSYMMETRICAL OLIGOQUATERNARY AMMONIUM COMPOUNDS

This application is a continuation of application Ser. No. 185,388, filed Sept. 30, 1971, which was a division of Ser. No. 82,594, filed Oct. 21, 1970, which was a continuation-in-part Ser. No. 716,412, filed Mar. 27, 1968, all three applications being now abandoned.

The present invention relates to unsymmetrical oligoquaternary ammonium compounds and, more particularly, to unsymmetrical oligoquaternary ammonium compounds containing at least two oniumnitrogen atoms, having anti-microbial activity, having anti-caries properties and having novel adsorption and desorption properties.

In recent years a multitude of quaternary ammonium compounds having antifungal and antibacterial capabilities have been disclosed. These quaternary ammonium compounds may be divided into two major groups (A) those quaternaries having only one onium nitrogen atom and (B) those quaternaries having more than one onium nitrogen atom. The latter group can be subdivided into bisquaternaries having two onium nitrogen atoms and tri and higher quaternaries having three or more onium nitrogen atoms. Each of these subdivisions of the poly-onium nitrogen atom quaternaries can be further divided into the symmetrical and the unsymmetrical poly-onium nitrogen atom quaternaries dependent upon the substituent groups attached to the terminal onium nitrogen atoms of the poly-onium nitrogen atom quaternaries. Thus, when all of the substituent groups attached to each terminal onium nitrogen atom are the same, the quaternary is considered to be symmetrical. When one or more of the substituent groups attached to one terminal onium nitrogen atom of a poly-onium nitrogen atom quaternary is or are different from the constituent groups attached to the other terminal onium nitrogen atom the quaternary is considered to be unsymmetrical or asymmetrical.

Those skilled in the art will recognize that prior art descriptions of poly-onium compounds do not indicate that the efficacy is dependent upon the number of $CH_2$-groups which separate the two onium-nitrogen atoms in the bis-quaternaries or that in the poly-onium compounds having three onium-nitrogen atoms that the efficacy is dependent upon the number of $CH_2$-groups separating from the central onium-nitrogen atom the terminal onium-nitrogen atom to which is bonded an alkyl group having ten or more carbon atoms. It has now been discovered that the number of $CH_2$-groups separating the aforesaid onium-nitrogen atoms is indicative of the efficacy of the germicidal properties and other properties such as cariostatic properties of the quaternary compound. In addition, the substantivity of these unsymmetrical quaternaries decreases as the concentration of methanol decreases in aqueous acid containing methanol in proportions varying from 0 to 55 percent as will be discussed below with regard to chromatography tests.

The novel poly-onium nitrogen compounds of the present invention can be represented by the formula

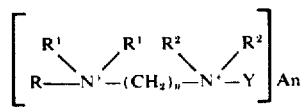

wherein R is a substantially straight chain alkyl group having 10 to 18 carbon atoms; Y is selected from the group consisting of $-CH_2C_6H[_{5-(m+p)}]R_m{}^3X_p$ and

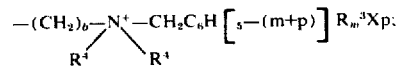

$n$ is an integer 2 to 18; $R^1$, $R^2$, $R^3$ and $R^4$ are lower alkyls having 1 to 3 carbon atoms; $b$ is an integer 2 to 12; X is selected from the group consisting of chlorine, bromine and iodine; $m$ is 0 to 3; $p$ is 0 to 3; $m+p$ is 0 to 3; An is a compatible anion, including halide, such as Cl, Br, or alkyl or phenyl sulfonate, such as $CH_3SO_3-$, $C_2H_5SO_3-$, $p-CH_3C_6H_4SO_3-$, etc. in sufficient number to satisfy the positive valence of the remainder of the compound, that is, 2 or 3. The An groups may be the same or different.

Illustrative of the effect of the value of $n$ in the formula set forth hereinbefore are the following data obtained in anti-microbial tests employing the following organisms:

| Organism No. | |
|---|---|
| 1 | *Staphylococcus aureus* (gram positive bacteria) |
| 2 | *Corynebacterium acnes* (gram positive bacteria) |
| 3 | *Bacillus subtilis* (gram positive bacteria) |
| 4 | *Escherichia coli* (gram negative bacteria) |
| 5 | *Pseudomonas aeruginosa* (gram negative bacteria) |
| 6 | *Candida albicans* (fungus) |
| 7 | *Trichophyton mentagrophytes* (fungus) |
| 8 | *Aspergillus niger* (fungus) |
| 9 | *Streptococcus mitis* (S-3) (gram positive bacteria) |

The serial dilution test to determine the minimal inhibitory concentration in $\mu g/ml$, i.e., $1 \times 10^{-3}$ mg/ml, has been used to illustrate this important characteristic of these novel poly-onium quaternary ammonium type materials. Two materials of this type, A and B, were used and the chain length ($n$) varied from 3 to 10 ($CH_2$) groups.

Compound A

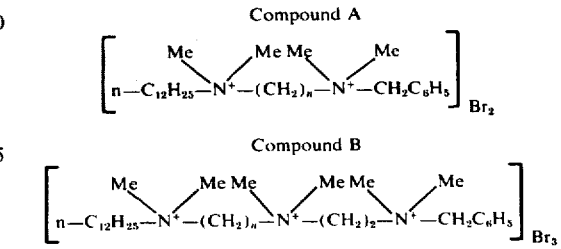

Compound B

In the above compounds, A and B as well as in structural formulae set forth hereinafter, Me indicates a methyl group.

Compound A

| Organism No. | 1 | 2 | 3 | 4 | 5 | 6 | 7 | 8 |
|---|---|---|---|---|---|---|---|---|
| n | $\mu g/ml$ | $\mu g/ml$ | $\mu g/ml$ | $\mu g/ml$ | $\mu g/ml$ | $\mu g/ml$ | $\mu g/ml$ | $\mu g/ml$ |

Compound A-continued

| Organism No. | 1 | 2 | 3 | 4 | 5 | 6 | 7 | 8 |
|---|---|---|---|---|---|---|---|---|
| 3 | 25 | 2.5 | 25 | >100 | >100 | 12.5 | 125 | 1000 |
| 4 | 50 | >100 | 12.5 | 100 | >100 | 25 | >1000 | 500 |
| 6 | 12.5 | 0.78 | 6.25 | 25 | 250 | 1.56 | <7.8 | 250 |
| 8 | 1.56 | <0.2 | 6.25 | 3.12 | 1000 | 1.56 | <7.8 | 31.2 |
| 10 | 0.78 | 0.025 | 1.56 | 12.5 | >100 | 0.78 | 7.8 | 31.3 |

Compound B

| Organism No. | 1 | 2 | 3 | 4 | 5 | 6 | 7 | 8 |
|---|---|---|---|---|---|---|---|---|
| 4 | 50 | 3.13 | 3.13 | 100 | >100 | 25 | 125 | 1000 |
| 10 | 1.56 | 0.78 | 0.78 | 6.25 | 15.6 | 0.78 | <7.8 | 125 |

Compounds having values of $n$, ranging from low to high, are effective antimicrobial agents. Generally, the compounds of greater effectiveness have higher values of $n$. Similar results may be observed when the methyl groups are replaced with ethyl and/or propyl groups.

The effect of a single nuclear substituent, such as a halogen substituent in the benzyl ring is clearly shown by the following comparative results using the serial dilution test and reporting the minimal inhibitory concentration in $\mu g/ml$, that is, $1 \times 10^{-4}$ mg/ml on compounds in which the chain length ($n$) was 4:

alkyl group such as n-tridecyl and longer alkyl groups such as n-pentadecyl, n-hexadecyl, n-heptadecyl and n-octadecyl.

In addition to the antimicrobial effectiveness of compounds of the invention, compounds of the invention are also effective in reducing formation of caries in mammals as demonstrated below:

Caries-susceptible hamsters bred either from the Keyes strain or the NIDR (National Institute for Dental Research) strain in groups of 15 males and 15 females per control group and per each test group were fed ad Compound A v. Compound A$_{hal}$ A   n—C$_{12}$H$_{25}$N$^+$Me$_2$(CH$_2$)$_4$N$^+$Me$_2$CH$_2$C$_6$H$_5$

A$_{hal}$   n—C$_{12}$H$_{25}$N$^+$Me$_2$(CH$_2$)$_4$N$^+$Me$_2$CH$_2$C$_6$H$_4$p—Cl Br$_2$

| Organism No. | 1 | 2 | 3 | 4 | 5 | 6 | 7 | 8 |
|---|---|---|---|---|---|---|---|---|
| | µg/ml | µg/ml | µg/ml | µg/ml | µg/ml | µg/ml | µg/ml | µg/ml |
| A | 50 | >100 | 12.5 | 100 | >100 | 25 | >1000 | 500 |
| A$_{hal}$ | 6.25 | 0.78 | 6.25 | 25 | 100 | 12.5 | 31.3 | 125 |

Compound B v. Compound B$_{hal}$

B   n—C$_{12}$H$_{25}$N$^+$Me$_2$(CH$_2$)$_4$N$^+$Me$_2$(CH$_2$)$_2$N$^+$Me$_2$CH$_2$C$_6$H$_5$

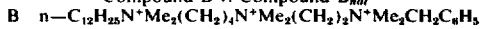

B$_{hal}$   n—C$_{12}$H$_{25}$N$^+$Me$_2$(CH$_2$)$_4$N$^+$Me$_2$(CH$_2$)$_2$N$^+$Me$_2$CH$_2$C$_6$H$_4$p—Cl Br$_2$Cl

| Organism No. | 1 | 2 | 3 | 4 | 5 | 6 | 7 | 8 |
|---|---|---|---|---|---|---|---|---|
| | µg/ml | µg/ml | µg/ml | µg/ml | µg/ml | µg/ml | µg/ml | µg/ml |
| B | 50 | 3.13 | 3.13 | 100 | >100 | 25 | 125 | 1000 |
| B$_{hal}$ | 12.5 | 6.25 | 0.78 | 25 | 100 | 25 | 15.6 | 250 |

Generally speaking the presence of a nuclear substituent such as a halogen substituent in the benzyl ring increases the antimicrobial effectiveness of compounds of the invention. In addition to or in place of the halogen substituent, alkyl substituent, such as methyl, ethyl or propyl, may be present in the benzyl ring.

The following compounds were also tested against the organisms described above and the inhibitory concentration indicated results below were obtained:

lib a Mitchell cariogenic diet and received constant deionized water. Each day each hamster's teeth were swabbed 30 seconds by cotton tipped swabs, the control group with water and each test group with its test solution. After 6 weeks of swabbing the animals were sacrificed, and the defleshed heads were scored by a modified version of the Keyes scoring method. Mean averages and percentage changes from the control group were determined and tested statistically to deter- Compound C$_{hal}$ n—C$_{12}$H$_{25}$N$^+$Me$_2$(CH$_2$)$_{10}$N$^+$Me$_2$CH$_2$C$_6$H$_4$p—Cl

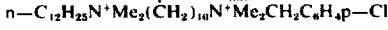

Compound D$_{hal}$ n—C$_{14}$H$_{29}$N$^+$Me$_2$(CH$_2$)$_{10}$N$^+$Me$_2$CH$_2$C$_6$H$_4$p—Cl

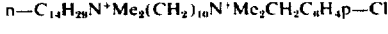

| Organism No. | 1 | 2 | 3 | 4 | 5 | 6 | 7 | 8 | 9 |
|---|---|---|---|---|---|---|---|---|---|
| | µg/ml | µg/ml | µg/ml | µg/ml | µg/ml | µg/ml | µg/ml | µg/ml | µg/ml |
| C$_{hal}$ | 0.78 | 3.12 | 0.39 | 1.56 | 62.5 | 0.78 | 31.2 | 250 | 3.12 |
| D$_{hal}$ | 0.39 | 3.12 | 0.19 | 0.78 | 31.2 | 0.78 | 1.9 | 62.5 | 0.39 |

Similar results may be obtained when the dodecyl and tetradecyl groups of Compounds C$_{hal}$ and D$_{hal}$ are replaced by shorter substantially straight chain alkyl groups such as n-decyl or n-undecyl, an intermediate mine the significance.

The compounds were administered in 1% by weight solutions.

| Results - Hamster Caries Test | | |
|---|---|---|
| Compound | Caries Reduction % Males | Females |
| n—$C_{12}H_{25}N^+(CH_3)_2(CH_2)_{10}N^+(CH_3)_2CH_2C_6H_4$p—Cl $Br_2$ | −75.4 | −77.9 |
| n—$C_{14}H_{29}N^+(CH_3)_2(CH_2)_{10}N^+(CH_3)_2CH_2C_6H_4$p—Cl $Br_2$ | −51.7 | −61.2 |

The results above indicate the significant effectiveness of the compounds of the invention in reducing caries formation.

When used against bacteria and fungi, compounds of the instant invention may be applied directly to the surface to be protected or may be used in a pharmaceutical carrier. Typically an effective amount, e.g. 0.1 to about 10% by weight of the quaternary is included in an inert liquid carrier such as water and a dispersing or surface active agent. Alternatively, an effective amount, e.g. 0.1 to about 10% by weight may be incorporated into a solid carrier which may be inert, such as talc, clay, diatomaceous earth, flour, etc.

taining ion such as sodium fluoride, stannous fluoride and sodium monofluorophosphate.

The oral preparation may also be a liquid such as a mouth rinse which typically contains 20–99% by weight of an aqueous alcohol vehicle, the alcohol being a cosmetically acceptable and nontoxic alcohol such as ethanol or isopropyl alcohol and being present in amount of about 5–30% by weight of the oral preparation.

Such oral preparations are typically applied by brushing the teeth or rinsing the oral cavity for 30–90 seconds at least once daily. Typical oral preparations including a compound of the instant invention are set forth as follows:

| Dental Cream | | Mouth Wash | |
|---|---|---|---|
| Component | Parts By Weight | Component | Parts By Weight |
| Quaternary $D_{hal}$ | 0.5 | Quaternary $C_{hal}$ | 0.25 |
| Sodium Benzoate | 0.15 | Ethyl Alcohol | 14.782 |
| Saccharine | 0.2 | Flavor | 0.318 |
| Insoluble Sodium Metaphosphate | 42.1 | Glycerine | 10.000 |
| Dicalcium Phosphate Dihydrate | 5.0 | Deionized Water | 74.1 |
| Titanium Dioxide | 0.4 | Color (1% Solution) | 0.55 |
| Gum Tragacanth | 1.4 | | |
| Oil of Wintergreen | 1.0 | | |
| Color | 0.03 | | |
| Water | 22.12 | | |
| Glycerine (99.3%) | 27.10 | | |

When compounds of the invention are used in compositions which reduce formation of caries they are typically incorporated in oral preparations in effective amounts up to about 5% by weight, preferably 0.1% and most preferably 0.25–0.5% by weight of the oral preparation. Typically the oral preparation is a dentifrice such as a dental cream, tablet or powder, containing as a vehicle about 20–95% by weight of a dentally acceptable water-insoluble polishing material, preferably including water-insoluble phosphates such as dicalcium phosphate, tricalcium phosphate, insoluble sodium metaphosphate and calcium pyrophosphate. The dentifrice may also include water, binders such as glycerine, sorbitol, propylene glycol and polyethylene glycol 400, gelling agents such as Irish moss and sodium carboxymethyl cellulose, additional antibacterial agents, coloring or whitening agents, preservatives, silicones, chlorophyll compounds, additional ammoniated materials, flavoring or sweetening materials and dentally beneficial compounds which provide fluorine-containing The novel poly-onium quaternary ammonium compounds of the present invention can be prepared by the methods of organic chemistry known by those skilled in the art. Presently, it is preferred to obtain these novel poly-onium compounds by first preparing a quaternary ammonium compound by the reaction of a tertiary amine with an alkylene dihalide under suitable reaction conditions. The reaction can be illustrated by the following equation:

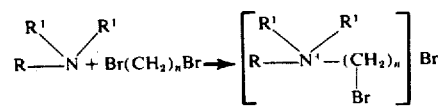

The trialkyl (ω-haloalkyl) ammonium bromide is then reacted with (1) dialkyl benzyl amine or (2) dialkyl halobenzylamine or (3) alkylated dialkylbenzylamine or (4) dialkyl polyhalobenzylamine as can be represented by the following equation:

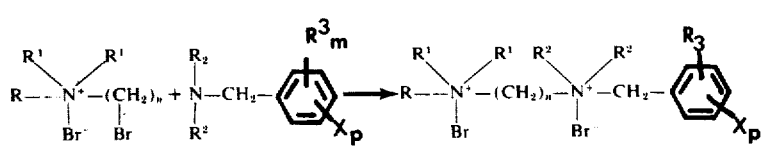

(The symbols R, R$^1$, R$^2$, R$^3$, X, n, m, and p in the foregoing equations have the same significance as hereinbefore initially defined.)

The unsymmetrical or asymmetrical bisquaternary amines in which R is n-C$_{12}$H$_{25}$; n is 3, 4, 6, 8, and 10; m is 0, p is 1 and X is chlorine, have been prepared in accordance with the method set forth in Example 1.

EXAMPLE 1 n-dodecyldimethylamine was reacted with a large excess of Br(CH$_2$)$_n$Br in water at 25°–40°C. to form n-dodecyldimethyl-(omega-bromoalkyl) ammonium bromide. This quaternary ammonium bromide was refluxed in water with a twofold excess of dimethyl-p-chlorobenzylamine. The products, the bisquaternary ammonium bromides in which n is 3, 4, 6 and 8, were recrystallized from acetone. The unsymmetrical or asymmetrical bis-quaternaries wherein R is n-C$_{12}$H$_{25}$; R$^1$ is CH$_3$; R$^2$ is CH$_3$; n is 3, 4, 6, 8 and 10; m is 0; and p is 0 were observed to have the following characteristics closely akin to the calculated characteristics:

n=3
    Br - 29.03% Cal.    N - 5.09% Cal.
    Br - 28.75% Obs.    N - 5.00% Obs.
n=4
    Br - 28.32% Cal.    N - 4.96% Cal.
    Br - 28.00% Obs.    N - 4.84% Obs.
n=6
    Br - 26.97% Cal.
    Br - 27.17% Obs.
n=8
    Br - 25.75% Cal.
    Br - 25.16% Obs.
n=10
    Br - 24.64% Cal.    N - 4.32% Cal.
    Br - 23.68% Obs.    N - 3.96% Obs.

These compounds are further characterized by the chromatographic properties hereinbefore described.

Compounds including 1-p-chlorophenyl-2,2,13,13-tetra-methyl-2,13-diazonia heptacosane dibromide [n-C$_{14}$H$_{29}$N$^+$(Me)$_2$(CH$_2$)$_{10}$N$^+$(Me)$_2$CH$_2$C$_6$H$_4$—p—Cl] Br$_2$ have been similarly prepared using tetradecyldimethyl amine as a starting reactant. Alternatively, the dimethyl-p-chlorobenzylamine can be reacted with alkylene dibromide [Br(CH$_2$)$_n$Br] and the reaction product reacted with tetradecyldimethyl amine.

The poly-onium quaternary ammonium compounds represented by the formula

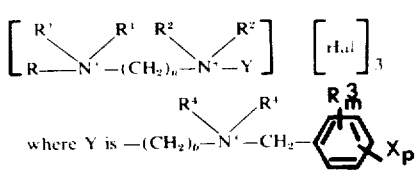

where Y is $-(CH_2)_b-N^+-CH_2-$ b is 2 or 3, n is 3 to 10 and is greater than b, m is 0 to 3, p is 0 to 3, n+p is 0 to 3, and Hal is a Halide while R, R$^1$, R$^2$, R$^3$, R$^4$ and X have the same significance as hereinbefore are prepared from the backbone, trialkyl-haloalkylhalide,

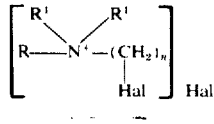

That is to say the trialkylhaloalkylhalide is reacted with N,N,N',N'-tetraalkyl alkylene diamine, e.g., N,N,N',N'-tetramethylethylenediamine to produce poly-onium halide as indicated by the following equation to obtain

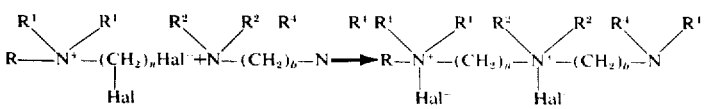

The poly-onium halide is then reacted with a benzyl halide to produce the poly-onium quaternary compound represented by the formula

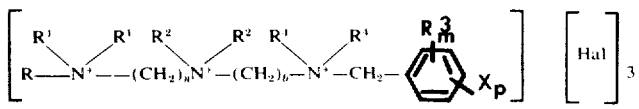

where R, R$^1$, R$^2$, R$^3$, X and Hal, n, b, m, and p have the same significance as hereinbefore indicated in this paragraph.

Illustrative of the preparation of these latter poly-onium quaternary ammonium compounds is the production of the quaternaries represented by the formula

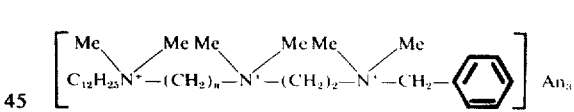

where n is 4 and 10 and An has the same significance as hereinbefore; and the quaternary represented by the formula

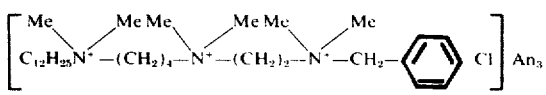

wherein An has the same significance as hereinbefore. These preparations are set forth in Example 2.

EXAMPLE 2 n-Dodecyldimethyl-omega-bromo-alkyl halide was reacted with N,N,N',N'-tetramethylethylenediamine at 25°C. in the molal ratio of 1:8. The resulting bis-quaternary was recrystallized from acetone-chloroform. The recrystallized bis-quaternary was reacted separately with benzyl bromide and chloro-benzyl bromide at 25°C. to obtain the poly-onium quaternary ammonium bromide. The poly-onium quaternary ammonium bromides thus prepared have the following characteristics:

[n-C$_{12}$H$_{25}$N$^+$Me$_2$(CH$_2$)$_4$N$^+$Me$_2$(CH$_2$)$_2$N-$^+$Me$_2$CH$_2$C$_6$H$_5$]Br$_3$·1/2 H$_2$O

|  | Cal. | Obs. |
|---|---|---|
| Bromine | 33.04% | 33.05% |
| Melting Point | 151–155°C. | |
| Nitrogen | 5.79% | 5.86% |

[n-C$_{12}$H$_{25}$N$^+$Me$_2$(CH$_2$)$_{10}$N$^+$Me$_2$(CH$_2$)$_2$N-$^+$Me$_2$CH$_2$C$_6$H$_5$] Br$_3$

|  | Cal. | Obs. |
|---|---|---|
| Bromine | 29.94% | 28.63% |
| Nitrogen | 5.25% | 4.93% |

[n-C$_{12}$H$_{25}$N$^+$Me$_2$(CH$_2$)$_4$N$^+$Me$_2$(CH$_2$)$_2$N$^+$Me$_2$CH$_2$C$_6$H$_4$Cl] Br$_2$Cl

|  | Cal. | Obs. |
|---|---|---|
| Total Halogen | 27.65% | 28.38% |

Although this invention has been described with reference to specific examples, it will be apparent to one skilled in the art that various modifications may be made thereto which fall within its scope.

What is claimed is:

1. An antimicrobial composition comprising about 0.1–10% by weight of an unsymmetrical poly-onium quaternary ammonium compound having the structural formula:

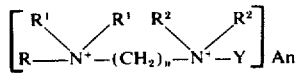

wherein R is a substantially straight chain alkyl group having 10 to 18 carbon atoms, Y is
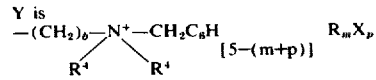

$n$ is an integer 2 to 18;
R$^1$, R$^2$, R$^3$ and R$^4$ are lower alkyls having 1 to 3 carbon atoms;
$b$ is an integer 2 to 12;
X is selected from the group consisting of chlorine, bromine and iodine;
$m$ is 0 to 3;
$p$ is 0 to 3;
$m+p$ is 0 to 3;
and
An is a compatible anion and a compatible inert pharmaceutical carrier therefor.

2. A method of inhibiting growth of microorganisms comprising applying to a surface infested with microorganisms an antimicrobial composition comprising about 0.1–10% by weight of an unsymmetrical poly-onium quaternary ammonium compound having the structural formula:

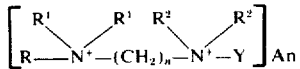

wherein R is a substantially straight chain alkyl group having 10 to 18 carbon atoms, Y is selected from the group consisting of —CH$_2$C$_6$H$_{[5-(m+p)]}$R$_m^3$X$_p$ and

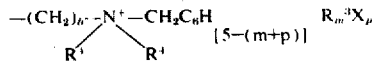

$n$ is an integer 2 to 18;
R$^1$, R$^2$, R$^3$ and R$^4$ are lower alkyls having 1 to 3 carbon atoms;
$b$ is an integer 2 to 12;
X is selected from the group consisting of chlorine, bromine and iodine;
$m$ is 0 to 3;
$p$ is 0 to 3;
$m+p$ is 0 to 3;
and
An is a compatible anion and a compatible inert pharmaceutical carrier therefor.

3. The method as set forth in claim 2 wherein R is n-C$_{12}$H$_{25}$, and $n$ is an integer 3 to 10.

4. The method as set forth in claim 3 wherein Y is
—CH$_2$C$_6$H [5–(m+p)]$^R$m$^3$p, $m$ is zero and $p$ is zero.

5. The method as set forth in claim 3 wherein Y is
—CH$_2$C$_6$H [5–(m+p)]$^R$m$^3$p, $m$ is zero, $p$ is 1 and X is chlorine.

6. The antimicrobial composition as set forth in claim 1 wherein Y is —(CH$_2$)N$^-$—CH$_2$C$_6$H$_5$, R is n-C$_{12}$H$_{25}$ and $n$ is an integer 3 to 10.

7. The antimicrobial composition as set forth in claim 1 wherein Y is —(CH$_2$)$_2$N$^-$—CH$_2$C$_6$H$_4$Cl, R is n-C$_{12}$H$_{25}$ and
$n$ is an integer 3 to 10.

8. The method as set forth in claim 2 wherein R is n-C$_{14}$H$_{29}$.

9. The antimicrobial composition as set forth in claim 8 wherein said compound is [n-C$_{14}$H$_{29}$N$^+$Me$_2$(CH$_2$)$_{10}$N-$^+$Me$_2$CH$_2$-C$_6$H$_{4p}$ -Cl]An
wherein Me is methyl.

10. An antimicrobial composition comprising about 0.1–10% by weight of an unsymmetrical poly-onium quaternary ammonium compound having the structural formula:

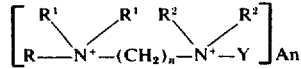

wherein R is a substantially straight chain alkyl group having 10 to 18 carbon atoms, Y is selected from the group consisting of —CH$_2$C$_6$H[5–(m+p)]$R_m^3 X_p$ and

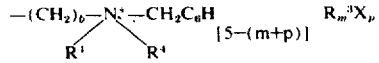

$n$ is an integer 2 to 18;
R$^1$, R$^2$, R$^3$ and R$^4$ are lower alkyls having 1 to 3 carbon atoms;
$b$ is an integer 2 to 12;

X is selected from the group consisting of chlorine, bromine and iodine;

$m$ is 0 to 3;

$p$ is 0 to 3;

$m+p$ is 0 to 3; and

An is a compatible anion and a compatible inert pharmaceutical carrier selected from the group consisting of talc, clay, diatomaceous earth and flour.

11. The antimicrobial composition as set forth in claim 10 wherein said pharmaceutical carrier is talc.

12. The antimicrobial composition as set forth in claim 12 wherein said pharmaceutical carrier is clay.

13. The antimicrobial composition ase set forth in claim 10 wherein said pharmaceutical carrier is diatomaceous earth.

14. The antimicrobial composition as set forth in claim 10 wherein said pharmaceutical carrier is flour.

* * * * *